(12) United States Patent
Holben

(10) Patent No.: US 10,198,002 B2
(45) Date of Patent: Feb. 5, 2019

(54) SYSTEMS AND METHODS FOR UNPROTECTED LEFT TURNS IN HIGH TRAFFIC SITUATIONS IN AUTONOMOUS VEHICLES

(71) Applicant: GM GLOBAL TECHNOLOGY OPERATIONS LLC, Detroit, MI (US)

(72) Inventor: Ryan Holben, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/820,272

(22) Filed: Nov. 21, 2017

(65) Prior Publication Data

US 2018/0074502 A1   Mar. 15, 2018

(51) Int. Cl.
| | |
|---|---|
| *G05D 1/00* | (2006.01) |
| *G05D 1/02* | (2006.01) |
| *B60W 30/09* | (2012.01) |
| *G08G 1/16* | (2006.01) |

(52) U.S. Cl.
CPC ........... *G05D 1/0088* (2013.01); *B60W 30/09* (2013.01); *G05D 1/0212* (2013.01); *G05D 1/0257* (2013.01); *G05D 1/0278* (2013.01); *G05D 2201/0213* (2013.01); *G08G 1/166* (2013.01)

(58) Field of Classification Search
CPC .. G05D 1/0088; G05D 1/0212; G05D 1/0257; G05D 1/0278; G05D 2201/0213; B60W 30/09; G08G 1/166
USPC .......................................................... 701/28
See application file for complete search history.

(56) References Cited

U.S. PATENT DOCUMENTS

| | | | |
|---|---|---|---|
| 9,672,734 B1* | 6/2017 | Ratnasingam | G08G 1/0112 |
| 2009/0112462 A1* | 4/2009 | Lo | G01C 21/34 |
| | | | 701/533 |
| 2016/0036558 A1* | 2/2016 | Ibrahim | H04L 67/18 |
| | | | 455/297 |

* cited by examiner

*Primary Examiner* — Gertrude Arthur Jeanglaude
(74) *Attorney, Agent, or Firm* — Lorenz & Kopf, LLP

(57) ABSTRACT

A method in an autonomous vehicle comprises determining to perform a left turn maneuver when the vehicle is in a stopping zone, the vehicle is clear of approaching vehicles, and a relevant traffic signal displays a go signal. The method further comprises determining to perform the left turn maneuver when the vehicle has entered a dilemma zone, the vehicle is clear of approaching vehicles, and the relevant traffic signal displays a go signal, a caution signal, or has displayed a stop signal for less than a predetermined amount of time. The method further comprises determining to perform the left turn maneuver when the vehicle has entered a cross-traffic zone, the vehicle is clear of approaching vehicles, and the relevant traffic signal displays a go signal, a caution signal, or a stop signal.

20 Claims, 8 Drawing Sheets

FIG. 4A          FIG. 4B

SYSTEMS AND METHODS FOR UNPROTECTED LEFT TURNS IN HIGH TRAFFIC SITUATIONS IN AUTONOMOUS VEHICLES

TECHNICAL FIELD

The present disclosure generally relates to autonomous vehicles, and more particularly relates to systems and methods for determining when to commence an unprotected left turn maneuver in an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, the control algorithms in an autonomous vehicle may not be optimized for determining when to commence an unprotected left turn maneuver in an autonomous vehicle.

Accordingly, it is desirable to provide systems and methods for improving the decision process in an autonomous vehicle when attempting an unprotected left turn maneuver. Furthermore, other desirable features and characteristics of the present invention will become apparent from the subsequent detailed description and the appended claims, taken in conjunction with the accompanying drawings and the foregoing technical field and background.

SUMMARY

A processor-implemented method in an autonomous vehicle for executing an unprotected left turn maneuver in one embodiment includes determining, by a processor, a current zone of the vehicle to be a first zone, a second zone, or a third zone. The method further includes determining, by the processor, to perform the left turn maneuver when the vehicle is in the first zone, clear of approaching vehicles and a relevant traffic signal displays a go signal. The method further includes determining, by the processor, to perform the left turn maneuver when the vehicle is in the second zone, clear of approaching vehicles and the relevant traffic signal displays a go signal, a caution signal, or has displayed a stop signal for less than a predetermined amount of time. The method further includes determining, by the processor, to perform the left turn maneuver when the vehicle is in the third zone or the velocity of the vehicle will propel the vehicle into the third zone, clear of approaching vehicles and the relevant traffic signal displays a go signal, a caution signal, or a stop signal. The method further includes communicating, by the processor, a message to vehicle controls conveying that a stop point may be lifted after it has been determined that the vehicle can perform the left turn maneuver.

In one embodiment, the first zone includes a stopping zone wherein the stopping zone ends at a stop line for the lane, the second zone includes a dilemma zone wherein the dilemma zone begins at the stop line for the lane and ends where the lane is intersected by cross-traffic, and the third zone includes a cross-traffic zone wherein the cross-traffic zone begins where the lane is intersected by cross-traffic.

In one embodiment, the method further includes determining, by the processor, that the vehicle has approached an intersection at which the vehicle will attempt an unprotected left turn maneuver, monitoring, by the processor, vehicle position data to determine whether the vehicle is positioned in the first zone, in the second zone, or the third zone, monitoring, by the processor, for one or more approaching vehicles in one or more opposing lanes to determine if the vehicle is clear of approaching vehicles that will cross within a desired turn path of the vehicle, and monitoring, by the processor, a traffic control device to determine if a relevant traffic signal for the lane in which the vehicle is located displays a go signal, a caution signal, or a stop signal.

In one embodiment, monitoring vehicle position data includes retrieving vehicle localization data that identifies the location of the vehicle on an internal vehicle map of the world.

In one embodiment, the vehicle localization data is derived from GPS sensor data.

In one embodiment, monitoring for one or more approaching vehicles includes identifying one or more oncoming objects from camera image, radar, or lidar data.

In one embodiment, determining that the vehicle is clear of approaching vehicles includes predicting the movement of the one or more oncoming objects and predicting whether the one or more predicted objects are traveling slow enough or will come to a stop to allow the vehicle to complete the left turn maneuver.

In one embodiment, monitoring a traffic control device includes retrieving camera image data that identifies whether the relevant traffic signal displays a green signal, a yellow signal, or a red signal.

A system is provided in one embodiment for controlling an autonomous vehicle that includes an intersection state machine that includes one or more processors configured by programming instructions encoded in non-transient computer readable media. For an autonomous vehicle approaching an intersection at which the vehicle will attempt an unprotected left turn maneuver from a lane, the intersection state machine is configured to determine a current zone of the vehicle to be a first zone, a second zone, or a third zone, determine to perform the left turn maneuver when the vehicle is in the first zone, clear of approaching vehicles from all opposing lanes and a relevant traffic signal displays a go signal, and determine to perform the left turn maneuver when the vehicle is in the second zone, clear of approaching vehicles from all opposing lanes and the relevant traffic signal displays a go signal, a caution signal, or has displayed a stop signal for less than a predetermined amount of time. The intersection state machine is further configured to determine to perform the left turn maneuver when the vehicle is in the third zone or the velocity of the vehicle will propel the vehicle into the third zone, clear of approaching vehicles and the relevant traffic signal displays a go signal, a caution signal, or a stop signal.

In one embodiment, the first zone includes a stopping zone wherein the stopping zone ends at a stop line for the lane, the second zone includes a dilemma zone wherein the dilemma zone begins at the stop line for the lane and ends where the lane is intersected by cross-traffic, and the third zone includes a cross-traffic zone wherein the cross-traffic zone begins where the lane is intersected by cross-traffic.

In one embodiment, the system further includes a world observer module that includes one or more processors configured by programming instructions encoded in non-transient computer readable media wherein the world observer module is configured to determine that the vehicle has approached an intersection at which the vehicle will attempt the unprotected left turn maneuver and invoke the intersection state machine to determine when the vehicle may perform the left turn maneuver.

In one embodiment, the system further includes a vehicle position module that includes one or more processors configured by programming instructions encoded in non-transient computer readable media wherein the vehicle position module is configured to monitor vehicle position data to determine whether the vehicle is positioned in the stopping zone, the dilemma zone, or the cross-traffic zone and provide the identity of the zone type in which the vehicle is positioned to the intersection state machine.

In one embodiment, the vehicle position module is configured to monitor vehicle position data by retrieving vehicle localization data derived from GPS sensor data that identifies the location of the vehicle on an internal vehicle map of the world.

In one embodiment, the system further includes a predicted objects module that includes one or more processors configured by programming instructions encoded in non-transient computer readable media wherein the predicted objects module is configured to monitor for one or more approaching vehicles in one or more opposing lanes to determine if the vehicle is clear of approaching vehicles that will cross within a desired turn path of the vehicle and provide an indication as to whether the vehicle is clear of approaching vehicles that will cross within a desired turn path of the vehicle to the intersection state machine.

In one embodiment, the predicted objects module is configured to monitor for one or more approaching vehicles using camera image, radar, or lidar data.

In one embodiment, the predicted objects module is configured to determine that the vehicle is clear of approaching vehicles by predicting the movement of the one or more oncoming objects and predicting whether the one or more predicted objects are traveling slow enough or will come to a stop to allow the vehicle to complete the left turn maneuver.

In one embodiment, the system further includes a traffic light monitoring module that includes one or more processors configured by programming instructions encoded in non-transient computer readable media wherein the traffic light monitoring module is configured to monitor a traffic control device to determine if a relevant traffic signal for the lane in which the vehicle is located displays a green signal, a yellow signal, or a red signal and provide the identity of the color displayed by the traffic signal to the intersection state machine.

In one embodiment, the system further includes a control module that includes one or more processors configured by programming instructions encoded in non-transient computer readable media wherein the control module is configured to receive a message from the intersection state machine conveying that a stop point may be lifted and control the vehicle to execute the left turn maneuver after receiving the message.

In one embodiment, the predetermined amount of time is 2.5 seconds.

An autonomous vehicle in accordance with one embodiment includes: a plurality of sensing devices configured to determine the location of the autonomous vehicle along a route, identify whether a relevant traffic signal displays a go signal, a caution signal, or a stop signal, and identify one or more oncoming vehicles using camera image, radar, or lidar data. The autonomous vehicle further includes an intersection state machine configured to, when the autonomous vehicle is in a stopping zone in a lane wherein the stopping zone ends at a stop line, determine to perform a left turn maneuver when the autonomous vehicle is clear of approaching vehicles from all opposing lanes and a relevant traffic signal displays the go signal. The intersection state machine is further configured to, when the autonomous vehicle has entered a dilemma zone wherein the dilemma zone begins at the stop line and ends at the closest place where the lane is intersected by cross-traffic, determine to perform the left turn maneuver when the autonomous vehicle is clear of approaching vehicles from all opposing lanes and the relevant traffic signal displays the go signal, the caution signal, or has displayed the stop signal for less than a predetermined amount of time. The intersection state machine is further configured to, when the autonomous vehicle has entered the cross-traffic zone or the velocity of the autonomous vehicle will propel the autonomous vehicle into the cross-traffic zone wherein the cross-traffic zone begins where the lane is intersected by cross-traffic, determine to perform the left turn maneuver when the autonomous vehicle is clear of approaching vehicles and the relevant traffic signal displays the go signal, the caution signal, or the stop signal.

DESCRIPTION OF THE DRAWINGS

The exemplary embodiments will hereinafter be described in conjunction with the following drawing figures, wherein like numerals denote like elements, and wherein:

FIGS. 4A, 4B, and 4C present top-down views of example scenarios useful in understanding the present subject matter, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
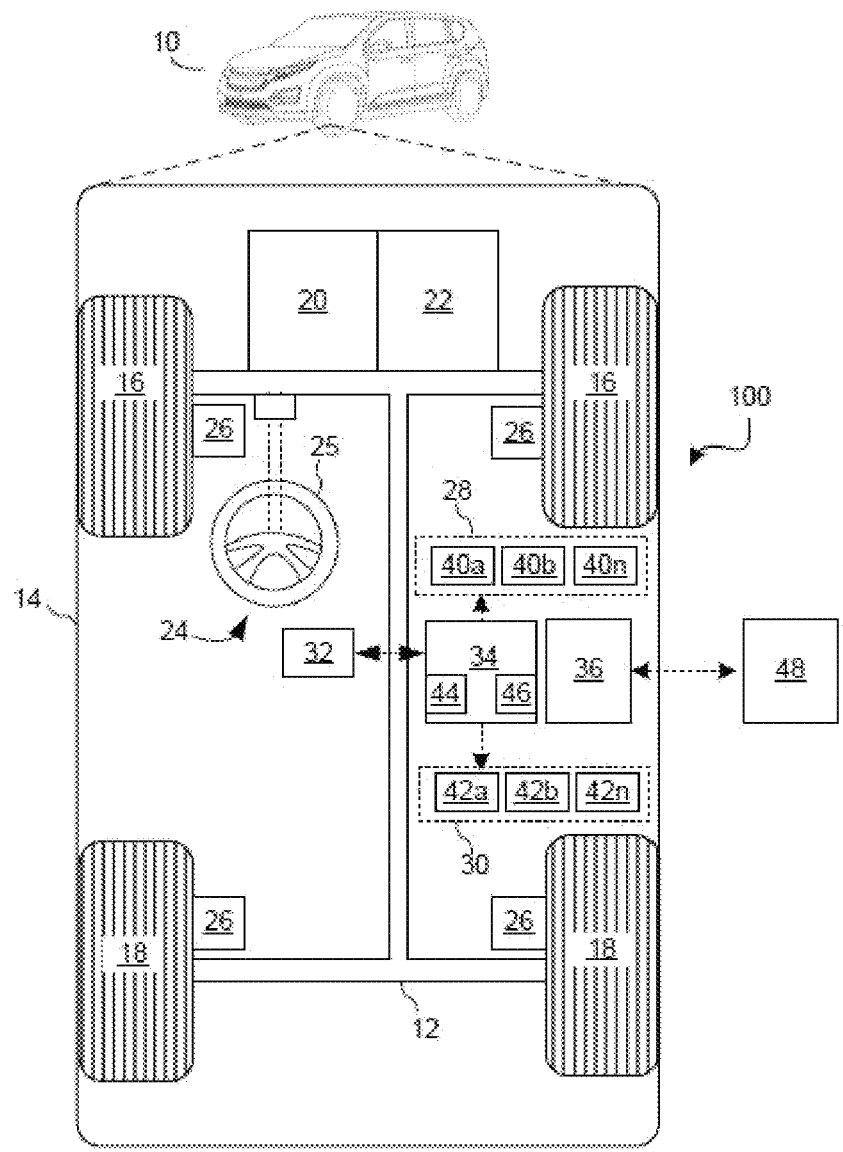
FIG. 1 is a functional block diagram illustrating an autonomous vehicle that includes a left turn management system, in accordance with various embodiments.

With reference to FIG. 1, a left turn management system shown generally as 100 is associated with a vehicle 10 in accordance with various embodiments. In general, left turn management system (or simply "system") 100 determines when the vehicle can perform an unprotected left turn maneuver so that vehicle controls may control the vehicle to perform the left turn maneuver.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the left turn management system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement a left turn management system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
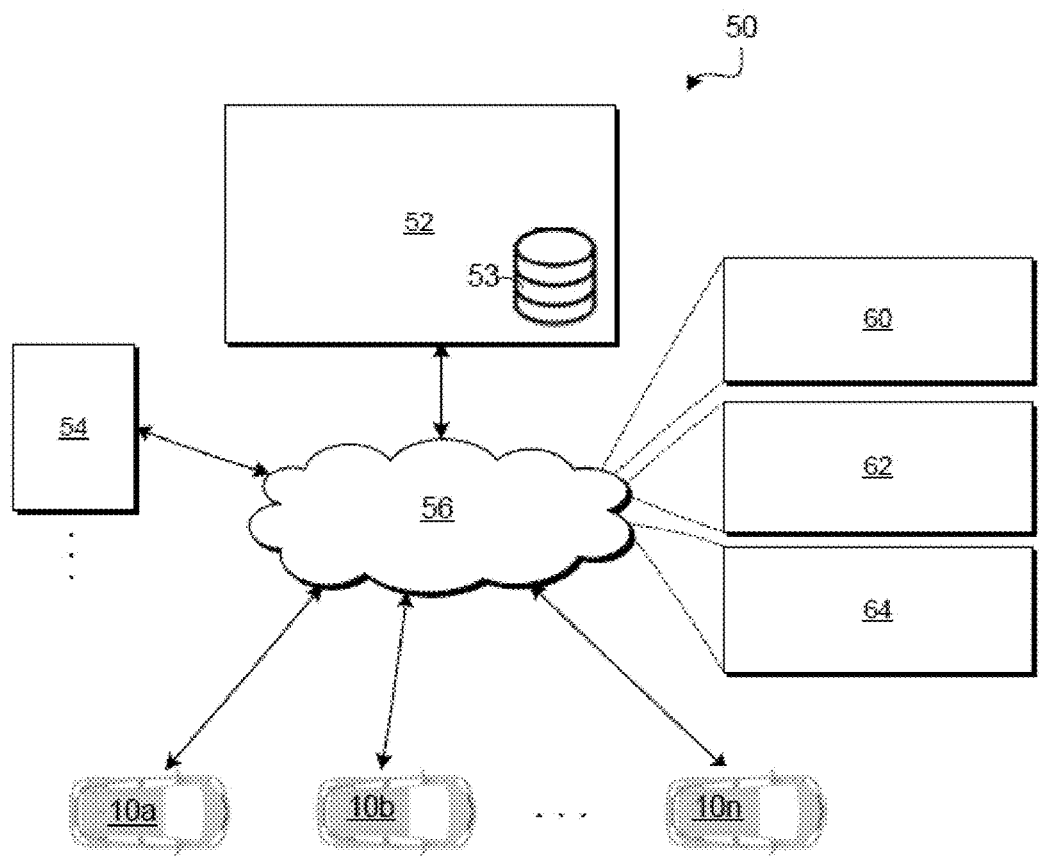
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
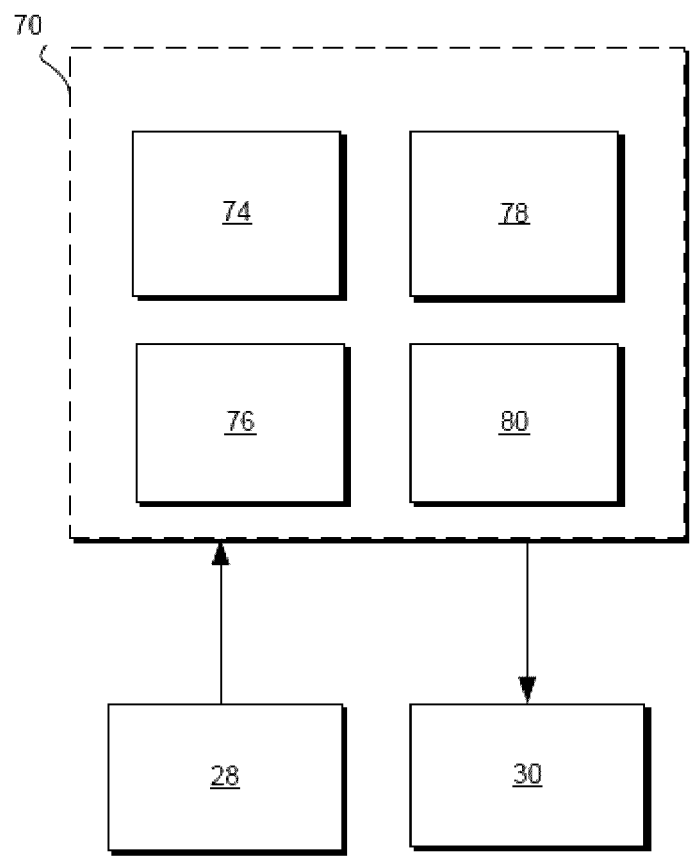
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 10. In various embodiments, the perception system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the left turn management system 100 may be included within the perception system 74, the positioning system 76, the path planning system 78, and/or the vehicle control system 80. As mentioned briefly above, the left turn management system 100 of FIG. 1 is configured to determine when an autonomous vehicle 10 should commence an unprotected left turn maneuver.

Figure 4C:
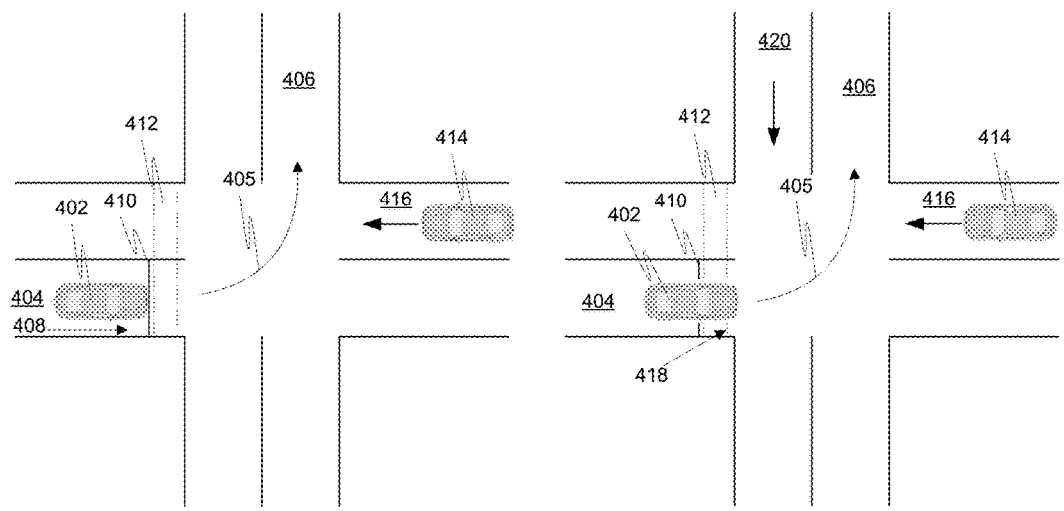
Figure 4C:
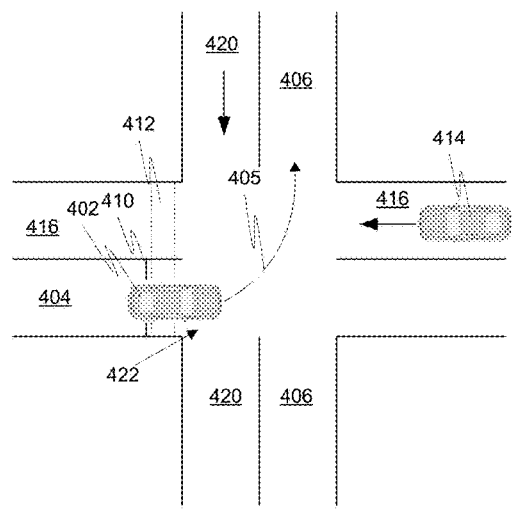

FIGS. 4A, 4B, and 4C present top-down views of example scenarios useful in understanding the present subject matter. More particularly, FIG. 4A illustrates an example autonomous vehicle 402 in a first lane 404 before making an unprotected left turn maneuver 405 into a second lane 406. In this example, an unprotected left turn is a left turn that is made against opposing traffic without a signal light that stops all traffic that may cross in the vehicle's turn path (e.g., vehicle's travel pathway during unprotected left turn maneuver). In this example, the example autonomous vehicle 402 is stopped in a stopping zone 408 behind a stop line 410 in the lane 404 that is positioned before a cross walk 412. The example autonomous vehicle 402 is waiting in the stopping zone 408 for an oncoming vehicle 414 in an opposing lane 416 to pass before attempting the unprotected left turn maneuver 405.

FIG. 4B also illustrates the example autonomous vehicle 402 in the first lane 404 before making an unprotected left turn maneuver 405 into the second lane 406. In this example, the example autonomous vehicle 402 is stopped in a dilemma zone 418 that begins at the stop line 410 in the lane 404 and ends at the closest place where the lane 404 is intersected by cross-traffic (e.g., traffic flowing in a lane 420 that cuts across the vehicle's lane 404). The dilemma zone 418 is the last area the vehicle 402 can stop without being in danger of being hit by another lawfully driven vehicle. The example autonomous vehicle 402 is waiting in the dilemma zone 418 (e.g., beyond the cross walk 412) for the oncoming vehicle 414 in the opposing lane 416 to pass before attempting the unprotected left turn maneuver 405.

FIG. 4C also illustrates the example autonomous vehicle 402 in the first lane 404 before making an unprotected left turn maneuver 405 into the second lane 406. In this example, the example autonomous vehicle 402 is stopped in a cross-traffic zone 422 that begins where the lane 404 is intersected by cross-traffic (e.g., traffic flowing in a lane 420 that cuts across the vehicle's lane 404). The cross-traffic zone 422 is an area in which the vehicle 402, if stopped, could be hit by another vehicle in the lane 420, by a vehicle that is turning from the cross-traffic lane 406 into the opposing lane 416, or a vehicle that is turning from the opposing lane 416 into the cross-traffic lane 420. The example autonomous vehicle 402 is waiting in the cross-traffic zone 422 for the oncoming vehicle 414 in the opposing lane 416 to pass before attempting the unprotected left turn maneuver 405.

Figure 5:
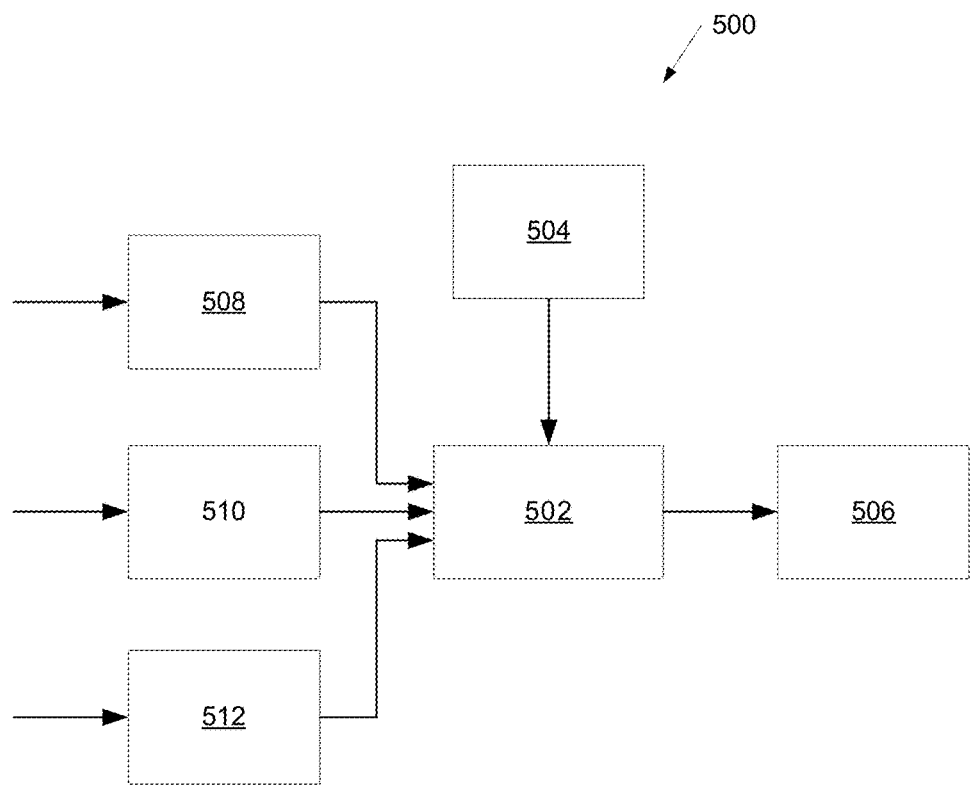
FIG. 5 is a block diagram depicting an example system in an autonomous vehicle for determining when the autonomous vehicle should attempt an unprotected left turn maneuver, in accordance with various embodiments.

FIG. 5 is a block diagram depicting an example system 500 in an autonomous vehicle for determining when the autonomous vehicle should attempt an unprotected left turn maneuver. The example system 500 includes an intersection state machine 502, a world observer module 504, a vehicle control module 506, a vehicle position module 508, a vehicle predicted objects module 510, and a traffic light monitoring module 512.

The example intersection state machine 502 is configured to be invoked in the example autonomous vehicle when the vehicle approaches an intersection at which the vehicle will attempt an unprotected left turn maneuver. The example intersection state machine 502 is further configured to determine when the vehicle can perform the unprotected left turn maneuver. The example intersection state machine 502 is also configured to communicate a message to the vehicle control module 506 conveying that a stop point may be lifted after the example intersection state machine 502 has determined that the vehicle can perform the left turn maneuver.

Figure 6:
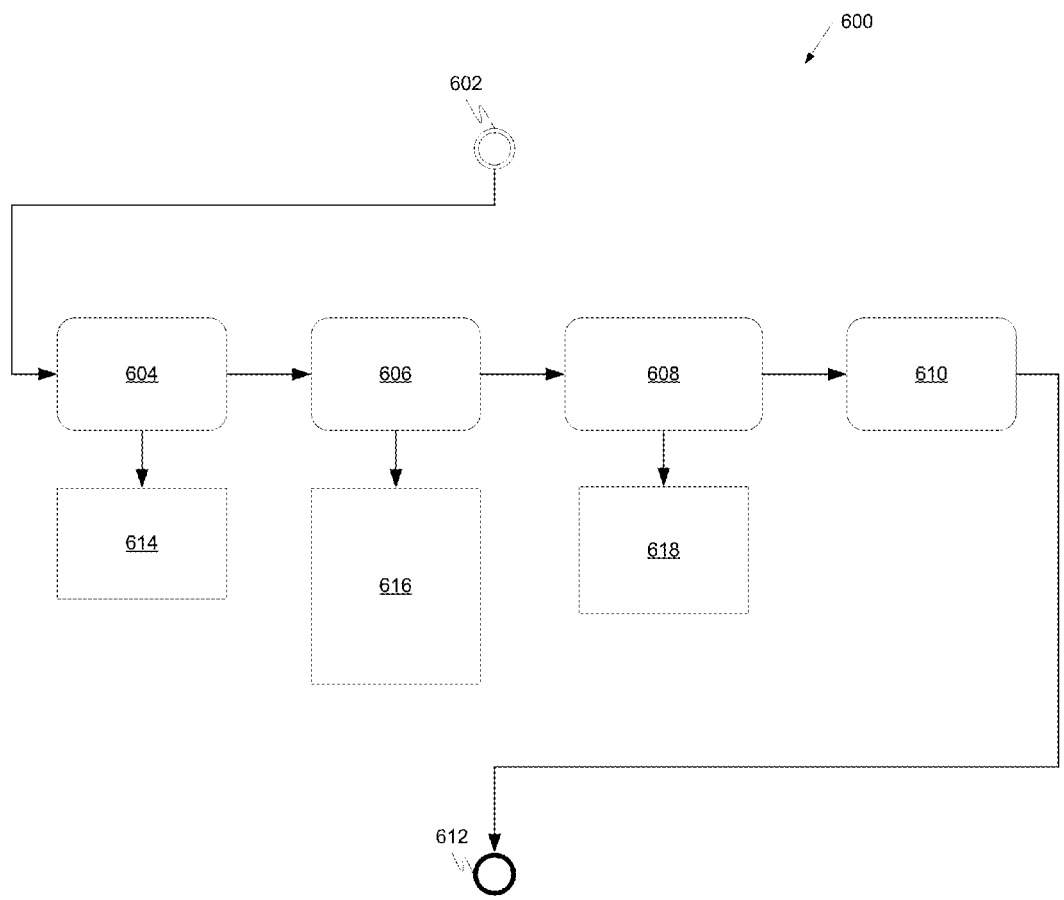
FIG. 6 is a state diagram depicting example states and operations of an example intersection state machine, in accordance with various embodiments.

FIG. 6 is a state diagram 600 depicting example states and operations of an example intersection state machine. With reference to FIGS. 5 and 6, when the example intersection state machine 502 is invoked (at 602), the state in which the example intersection state machine 502 operates is determined by the vehicle's location relative to an intersection at which the vehicle is to perform an unprotected left turn maneuver. The vehicle may be in one of three zones, a stopping zone, a dilemma zone, or a cross-traffic zone, and the example state machine 502 correspondingly in one of three states, a stopping zone state 604, a dilemma zone state 606, or a cross-traffic zone state 608, prior to the vehicle performing the turn and the example state machine 502 entering a state 610 during which an unprotected left turn maneuver is performed. After the left turn maneuver is performed, the example state machine 502 ends operations (at 612). The example state machine 502 does not directly control the movement of the vehicle but signals when the vehicle may begin the left turn maneuver by communicating lift turn stop message (e.g., a message to lift the stop point) to vehicle controls (e.g., control module 506).

When the vehicle is in a stopping zone (and the example intersection state machine is at state 604), the intersection state machine is configured to determine that the vehicle can perform the left turn maneuver when the vehicle is clear of approaching vehicles from all opposing lanes and a relevant traffic signal displays a green signal indicating that traffic in the vehicle's lane may proceed. The example intersection state machine 502 is further configured to communicate a lift turn stop message to vehicle controls under these conditions (operation 614).

When the vehicle has entered a dilemma zone (and the example intersection state machine is at state 606), the intersection state machine is configured to determine that the vehicle can perform the left turn maneuver when the vehicle is clear of approaching vehicles from all opposing lanes and the relevant traffic signal displays a green signal, a yellow signal, or has displayed a red signal for less than a predetermined amount of time. The predetermined amount of time in this example is 2.5 seconds. The example intersection state machine 502 is further configured to communicate a lift turn stop message to vehicle controls under these conditions (operation 616).

When the vehicle has entered the cross-traffic zone or the velocity of the vehicle will propel the vehicle into the cross-traffic zone (and the example intersection state machine is at state 608), the intersection state machine is configured to determine when the vehicle can perform the left turn maneuver. When the relevant traffic signal displays a green signal, a yellow signal, or a red signal, the example intersection state machine may decide that the stop point may be lifted when the vehicle is clear of approaching vehicles and the example intersection state machine 502 is configured to communicate a lift turn stop message to vehicle controls under these conditions (operation 618).

The example world observer module 504 is configured to monitor the position of the vehicle at all times, determine that the vehicle has approached an intersection at which the vehicle will attempt an unprotected left turn maneuver, and invoke the intersection state machine to determine when the vehicle may perform the left turn maneuver.

The example vehicle control module 506, among other things, is configured to receive a message from the intersection state machine conveying that a stop point may be lifted. The example vehicle control module 506 is further configured to control the vehicle to execute the left turn maneuver after receiving the message conveying that the stop has been lifted.

The example vehicle position module 508 is configured to monitor vehicle position data to determine whether the vehicle is positioned in the stopping zone, the dilemma zone, or the cross-traffic zone and provide the identity of the zone type in which the vehicle is positioned to the intersection state machine. The vehicle position module is further configured to monitor vehicle position data by retrieving vehicle localization data derived from GPS sensor data that identifies the location of the vehicle on an internal (e.g., local to the vehicle) vehicle map of the world.

The example vehicle predicted objects module 510 is configured to monitor for one or more approaching vehicles in one or more opposing lanes to determine if the vehicle is clear of approaching vehicles that will cross within a desired turn path of the vehicle and provide an indication as to whether the vehicle is clear of approaching vehicles that will cross within a desired turn path of the vehicle to the intersection state machine. The predicted objects module is configured to monitor for one or more approaching vehicles using camera image, radar, and/or lidar data. The predicted objects module is configured to determine that the vehicle is clear of approaching vehicles by predicting the movement of the one or more oncoming objects and predicting whether the one or more predicted objects are traveling slow enough or will come to a stop to allow the vehicle to complete the left turn maneuver.

The example traffic light monitoring module 512 is configured to monitor a traffic control device to determine if a relevant traffic signal for the lane in which the vehicle is located displays a green signal, a yellow signal, or a red signal. The example traffic light monitoring module 512 is configured to provide the identity of the color displayed by the traffic signal to the intersection state machine. The example traffic light monitoring module 512 is further configured to retrieve camera image data that identifies whether the relevant traffic signal displays a go (e.g., green) signal, a caution (e.g., yellow) signal, or a stop (e.g., red) signal.

An example system 100 or 500 may include any number of additional sub-modules embedded within the controller 34 which may be combined and/or further partitioned to similarly implement systems and methods described herein. Additionally, inputs to the system 100 or 500 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

The various modules described above may be implemented as one or more machine learning models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

In some embodiments, training of any machine learning models used by system 100 or 500 occurs within a system remote from vehicle 10 (e.g., system 52 in FIG. 2) and is subsequently downloaded to vehicle 10 for use during normal operation of vehicle 10. In other embodiments, training occurs at least in part within controller 34 of vehicle 10, itself, and the model is subsequently shared with external systems and/or other vehicles in a fleet (such as depicted in FIG. 2). Training data may similarly be generated by vehicle 10 or acquired externally, and may be partitioned into training sets, validation sets, and test sets prior to training.

Figure 7:
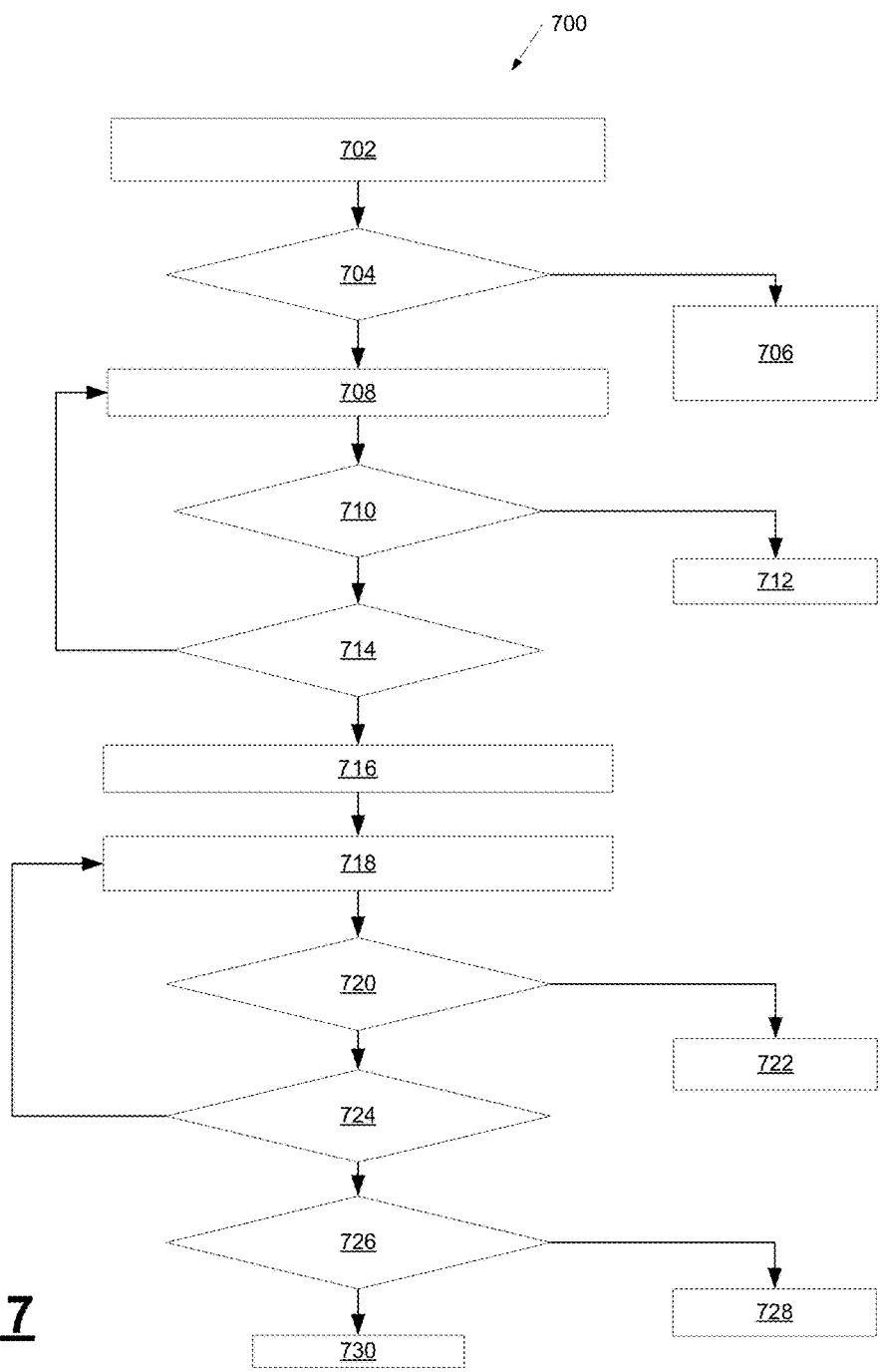
FIG. 7 is a process flow chart depicting an example process in an autonomous vehicle for determining when the autonomous vehicle should attempt an unprotected left turn maneuver, in accordance with various embodiments.

FIG. 7 is a process flow chart depicting an example process 700 in an autonomous vehicle for determining when the autonomous vehicle should attempt an unprotected left turn maneuver. The example process 700 begins when a relevant traffic light is displaying a yellow signal while the autonomous vehicle waits for clearance to perform an unprotected left turn maneuver (operation 702). A determination is made regarding whether the autonomous vehicle has entered or passed a dilemma zone (decision 704). If the autonomous vehicle has not entered or passed a dilemma zone (no at decision 704), the autonomous vehicle stops (or remains stopped) and waits for the relevant traffic light to display a green traffic signal before resuming the attempt to perform the unprotected left turn maneuver (operation 706).

If the autonomous vehicle has entered or passed a dilemma zone (yes at decision 704), the autonomous vehicle continues to wait for traffic to clear in opposing lanes before performing the unprotected left turn maneuver (operation 708). A determination is made regarding whether the traffic has cleared in opposing lanes (decision 710). If traffic has cleared in opposing lanes (yes at decision 710), the autonomous vehicle may perform the unprotected left turn maneuver (operation 712). If traffic has not cleared in opposing lanes (no at decision 710), a determination is made regarding whether the relevant traffic light is displaying a red signal (decision 714). If the relevant traffic light is not displaying a red signal (no at decision 714), the autonomous vehicle continues to wait for traffic to clear in opposing lanes before performing the unprotected left turn maneuver (operation 708).

If the relevant traffic light is displaying a red signal (yes at decision 714), a count-down timer with a length of 2.5 seconds in this example is started (operation 716). The autonomous vehicle continues to wait for traffic to clear in opposing lanes (operation 718). A determination is made regarding whether the traffic has cleared in opposing lanes (decision 720). If traffic has cleared in opposing lanes (yes at decision 720), the autonomous vehicle may perform the unprotected left turn maneuver (operation 722). If traffic has not cleared in opposing lanes (no at decision 720), a determination is made regarding whether the count-down timer has finished counting down (decision 724). If the count-down timer has not finished counting down (no at decision 724), the autonomous vehicle continues to wait for traffic to clear in opposing lanes (operation 718).

If the count-down timer has finished counting down (yes at decision 724), a determination is made regarding whether the forward velocity of the autonomous vehicle will propel the vehicle into cross traffic (decision 726). If it is determined that the forward velocity of the autonomous vehicle will not propel the vehicle into cross traffic (no at decision 726), the autonomous vehicle stops (or remains stopped) and waits for the relevant traffic light to display a green traffic signal before resuming the attempt to perform the unprotected left turn maneuver (operation 728). If it is determined that the forward velocity of the autonomous vehicle will propel the vehicle into cross traffic (yes at decision 726), the autonomous vehicle may perform the unprotected left turn maneuver (operation 730).

Figure 8:
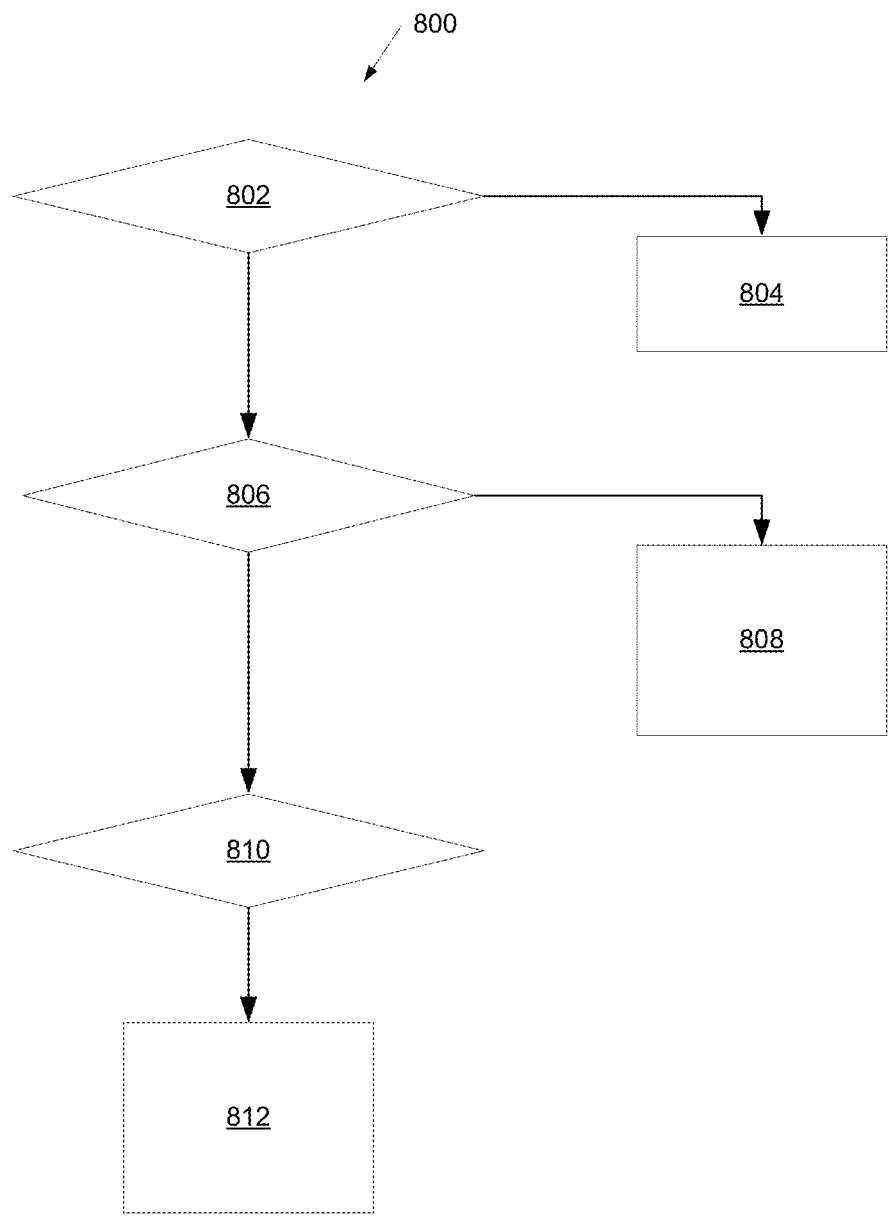
FIG. 8 is a process flow chart depicting another example process in an autonomous vehicle for determining when the autonomous vehicle should attempt an unprotected left turn maneuver, in accordance with various embodiments.

FIG. 8 is a process flow chart depicting another example process 800 in an autonomous vehicle for determining when the autonomous vehicle should attempt an unprotected left turn maneuver. The example process 800 includes determining if the vehicle is in a stopping zone (operation 802). When the vehicle is in the stopping zone, the vehicle may perform the left turn maneuver when the vehicle is clear of approaching vehicles from all opposing lanes and a relevant traffic signal displays a green signal (operation 804).

The example process 800 includes determining if the vehicle has entered a dilemma zone (decision 806). When the vehicle has entered the dilemma zone, the vehicle may perform the left turn maneuver when the vehicle is clear of approaching vehicles from all opposing lanes and the relevant traffic signal displays a green signal, a yellow signal, or has displayed a red signal for less than a predetermined amount of time (operation 808).

The example process 800 includes determining if the vehicle has entered the cross-traffic zone or the velocity of the vehicle will propel the vehicle into the cross-traffic zone (decision 810). If the vehicle has entered the cross-traffic zone or the velocity of the vehicle will propel the vehicle into the cross-traffic zone, the vehicle may perform the left turn maneuver when the vehicle is clear of approaching vehicles and the relevant traffic signal displays a green signal, a yellow signal, or a red signal (operation 812).

In one embodiment, a processor-implemented method in an autonomous vehicle for executing an unprotected left turn maneuver is provided. The method comprises determining, by a processor, a current zone of the vehicle to be at least one of a first zone, a second zone, or a third zone. The method further comprises determining, by the processor, to perform the left turn maneuver when the vehicle is in the first zone, clear of approaching vehicles and a relevant traffic signal displays a green signal. The method further comprises determining to perform the left turn maneuver when the vehicle is in the second zone, clear of approaching vehicles and the relevant traffic signal displays a green signal, a yellow signal, or has displayed a red signal for less than a predetermined amount of time. The method further comprises determining, by the processor, to perform the left turn maneuver when the vehicle is in the third zone or the velocity of the vehicle will propel the vehicle into the third zone, clear of approaching vehicles and the relevant traffic signal displays a green signal, a yellow signal, or a red signal. The method further comprises communicating, by the processor, a message to vehicle controls conveying that a stop point may be lifted after it has been determined that the vehicle can perform the left turn maneuver.

These aspects and other embodiments may include one or more of the following features. The first zone may comprise a stopping zone wherein the stopping zone ends at a stop line for the lane, the second zone may comprise a dilemma zone wherein the dilemma zone begins at the stop line for the lane and ends where the lane is intersected by cross-traffic, and the third zone may comprise a cross-traffic zone wherein the cross-traffic zone begins where the lane is intersected by cross-traffic. The method may further comprise determining, by the processor, that the vehicle has approached an intersection at which the vehicle will attempt an unprotected left turn maneuver, monitoring, by the processor, vehicle position data to determine whether the vehicle is positioned in the first zone, in the second zone, or in the third zone, monitoring, by the processor, for one or more approaching vehicles in one or more opposing lanes to determine if the vehicle is clear of approaching vehicles that will cross within a desired turn path of the vehicle, and monitoring, by the processor, a traffic control device to determine if a relevant traffic signal for the lane in which the vehicle is located displays a green signal, a yellow signal, or a red signal.

Monitoring vehicle position data may comprise retrieving vehicle localization data that identifies the location of the vehicle on an internal vehicle map of the world. The vehicle localization data may be derived from GPS sensor data. Monitoring for one or more approaching vehicles may comprise identifying one or more oncoming objects from camera image, radar, or lidar data. Determining that the vehicle is clear of approaching vehicles may comprise predicting the movement of the one or more oncoming objects and predicting whether the one or more predicted objects are traveling slow enough or will come to a stop to allow the vehicle to complete the left turn maneuver. Monitoring a traffic control device comprises retrieving camera image data that identifies whether the relevant traffic signal displays a green signal, a yellow signal, or a red signal. The method may further comprise controlling the vehicle to execute the left turn maneuver after receiving a message conveying that the stop point may be lifted.

In another embodiment, a system is provided for controlling an autonomous vehicle comprising an intersection state machine that comprises one or more processors configured by programming instructions encoded in non-transient computer readable media. For an autonomous vehicle approaching an intersection at which the vehicle will attempt an unprotected left turn maneuver from a lane the intersection state machine is configured to determine a current zone of the vehicle to be at least one of a first zone, a second zone, or a third zone, determine to perform the left turn maneuver when the vehicle is in the first zone, clear of approaching vehicles from all opposing lanes and a relevant traffic signal displays a green signal, and determine to perform the left turn maneuver when the vehicle is in the second zone, clear of approaching vehicles from all opposing lanes and the relevant traffic signal displays a green signal, a yellow signal, or has displayed a red signal for less than a predetermined amount of time. The intersection state machine is further configured to determine to perform the left turn maneuver when the vehicle is in the third zone or the velocity of the vehicle will propel the vehicle into the third zone, clear of approaching vehicles and the relevant traffic signal displays a green signal, a yellow signal, or a red signal.

These aspects and other embodiments may include one or more of the following features. The first zone may comprise a stopping zone wherein the stopping zone ends at a stop line for the lane, the second zone may comprise a dilemma zone wherein the dilemma zone begins at the stop line for the lane and ends where the lane is intersected by cross-traffic, and the third zone may comprise a cross-traffic zone wherein the cross-traffic zone begins where the lane is intersected by cross-traffic. The system may further comprise a world observer module that comprises one or more processors configured by programming instructions encoded in non-transient computer readable media wherein the world observer module is configured to determine that the vehicle has approached an intersection at which the vehicle will attempt the unprotected left turn maneuver and invoke the intersection state machine to determine when the vehicle may perform the left turn maneuver.

The system may further comprise a vehicle position module that comprises one or more processors configured by programming instructions encoded in non-transient computer readable media wherein the vehicle position module is configured to monitor vehicle position data to determine whether the vehicle is positioned in the stopping zone, the dilemma zone, or the cross-traffic zone and provide the identity of the zone type in which the vehicle is positioned to the intersection state machine. The vehicle position module may be configured to monitor vehicle position data by retrieving vehicle localization data derived from GPS sensor data that identifies the location of the vehicle on an internal vehicle map of the world.

The system may further comprise a predicted objects module that comprises one or more processors configured by programming instructions encoded in non-transient computer readable media wherein the predicted objects module is configured to monitor for one or more approaching vehicles in one or more opposing lanes to determine if the vehicle is clear of approaching vehicles that will cross within a desired turn path of the vehicle and provide an indication as to whether the vehicle is clear of approaching vehicles that will cross within a desired turn path of the vehicle to the intersection state machine. The predicted objects module may be configured to monitor for one or more approaching vehicles using camera image, radar, or lidar data. The predicted objects module may be configured to determine that the vehicle is clear of approaching vehicles by predicting the movement of the one or more oncoming objects and predicting whether the one or more predicted objects are traveling slow enough or will come to a stop to allow the vehicle to complete the left turn maneuver.

The system may further comprise a traffic light monitoring module that comprises one or more processors configured by programming instructions encoded in non-transient computer readable media wherein the traffic light monitoring module configured to monitor a traffic control device to determine if a relevant traffic signal for the lane in which the vehicle is located displays a green signal, a yellow signal, or a red signal and provide the identity of the color displayed by the traffic signal to the intersection state machine. The traffic light monitoring module may be configured to retrieve camera image data that identifies whether the relevant traffic signal displays a green signal, a yellow signal, or a red signal.

The system may further comprise a control module that comprises one or more processors configured by programming instructions encoded in non-transient computer readable media wherein the control module is configured to receive a message from the intersection state machine conveying that a stop point may be lifted and control the vehicle to execute the left turn maneuver after receiving the message. The predetermined amount of time may comprise 2.5 seconds.

In another embodiment, an autonomous vehicle is provided. The autonomous vehicle comprises a plurality of sensing devices configured to determine the location of the vehicle along a route, identify whether a relevant traffic signal displays a green signal, a yellow signal, or a red signal, and identify one or more oncoming vehicles using camera image, radar, or lidar data. The autonomous vehicle further comprises an intersection state machine configured to, when the vehicle is in a stopping zone in a lane wherein the stopping zone ends at a stop line, determine to perform a left turn maneuver when the vehicle is clear of approaching vehicles from all opposing lanes and a relevant traffic signal displays a green signal. The intersection state machine is further configured to, when the vehicle has entered a dilemma zone wherein the dilemma zone begins at the stop line and ends at the closest place where the lane is intersected by cross-traffic, determine to perform the left turn maneuver when the vehicle is clear of approaching vehicles from all opposing lanes and the relevant traffic signal displays a green signal, a yellow signal, or has displayed a red signal for less than a predetermined amount of time. The intersection state machine is further configured to, when the vehicle has entered the cross-traffic zone or the velocity of the vehicle will propel the vehicle into the cross-traffic zone wherein the cross-traffic zone begins where the lane is intersected by cross-traffic, determine to perform the left turn maneuver when the vehicle is clear of approaching vehicles and the relevant traffic signal displays a green signal, a yellow signal, or a red signal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A processor-implemented method in an autonomous vehicle for executing an unprotected left turn maneuver, the method comprising:
   determining, by a processor, a current zone of the vehicle to be at least one of a first zone, a second zone, or a third zone;
   determining, by the processor, to perform a left turn maneuver when the vehicle is in the first zone, clear of approaching vehicles and a relevant traffic signal displays a go signal;
   determining, by the processor, to perform the left turn maneuver when the vehicle is in the second zone, clear of approaching vehicles and the relevant traffic signal displays a go signal, a caution signal, or has displayed a stop signal for less than a predetermined amount of time;
   determining, by the processor, to perform the left turn maneuver when, the vehicle is in the third zone or the velocity of the vehicle will propel the vehicle into the third zone, clear of approaching vehicles; and communicating, by the processor, a message to vehicle controls conveying that a stop point may be lifted after it has been determined that the vehicle can perform the left turn maneuver.

2. The method of claim 1, wherein:

the first zone comprises a stopping zone wherein the stopping zone ends at a stop line for the lane;

the second zone comprises a dilemma zone wherein the dilemma zone begins at the stop line for the lane and ends where the lane is intersected by cross-traffic; and the third zone comprises a cross-traffic zone wherein the cross-traffic zone begins where the lane is intersected by cross-traffic.

3. The method of claim 1, further comprising:

determining, by the processor, that the vehicle has approached an intersection at which the vehicle will attempt an unprotected left turn maneuver;

monitoring, by the processor, vehicle position data to determine whether the vehicle is positioned in the first zone, in the second zone, or the third zone;

monitoring, by the processor, for one or more approaching vehicles in one or more opposing lanes to determine if the vehicle is clear of the one or more approaching vehicles that will cross within a desired turn path of the vehicle; and monitoring, by the processor, a traffic control device to determine if a relevant traffic signal for the lane in which the vehicle is located displays a go signal, a caution signal, or a stop signal.

4. The method of claim 3, wherein monitoring vehicle position data comprises retrieving vehicle localization data that identifies the location of the vehicle on an internal vehicle map of the world.

5. The method of claim 4, wherein the vehicle localization data is derived from GPS sensor data.

6. The method of claim 3, wherein monitoring for one or more approaching vehicles comprises identifying one or more oncoming objects from camera image, radar, or lidar data.

7. The method of claim 6, wherein determining that the vehicle is clear of approaching vehicles comprises:

predicting the movement of the one or more oncoming objects; and predicting whether the one or more predicted objects are traveling slow enough or will come to a stop to allow the vehicle to complete the left turn maneuver.

8. The method of claim 3, wherein monitoring a traffic control device comprises retrieving camera image data that identifies whether the relevant traffic signal displays a green signal, a yellow signal, or a red signal.

9. A system for controlling an autonomous vehicle comprising an intersection state machine that comprises one or more processors configured by programming instructions encoded in non-transient computer readable media, for an autonomous vehicle approaching an intersection at which the vehicle will attempt an unprotected left turn maneuver from a lane the intersection state machine configured to:

determine a current zone of the vehicle to be at least one of a first zone, a second zone, or a third zone;

determine to perform the left turn maneuver when the vehicle is in the first zone, clear of approaching vehicles from all opposing lanes, and a relevant traffic signal displays a go signal;

determine to perform the left turn maneuver when the vehicle is in the second zone, clear of approaching vehicles from all opposing lanes and the relevant traffic signal displays a go signal, a caution signal, or has displayed a stop signal for less than a predetermined amount of time; and determine to perform the left turn maneuver when the vehicle is in the third zone or the velocity of the vehicle will propel the vehicle into the third zone, clear of approaching vehicles and the relevant traffic signal displays a go signal, a caution signal, or a stop signal.

10. The system of claim 9, wherein:

the first zone comprises a stopping zone wherein the stopping zone ends at a stop line for the lane;

the second zone comprises a dilemma zone wherein the dilemma zone begins at the stop line for the lane and ends where the lane is intersected by cross-traffic; and the third zone comprises a cross-traffic zone wherein the cross-traffic zone begins where the lane is intersected by cross-traffic.

11. The system of claim 9, further comprising a world observer module that comprises one or more processors configured by programming instructions encoded in non-transient computer readable media, the world observer module configured to:

determine that the vehicle has approached an intersection at which the vehicle will attempt the unprotected left turn maneuver; and invoke the intersection state machine to determine when the vehicle may perform the left turn maneuver.

12. The system of claim 10, further comprising a vehicle position module that comprises one or more processors configured by programming instructions encoded in non-transient computer readable media, the vehicle position module configured to:

monitor vehicle position data to determine whether the vehicle is positioned in the stopping zone, the dilemma zone, or the cross-traffic zone; and provide the identity of the zone type in which the vehicle is positioned to the intersection state machine.

13. The system of claim 12, wherein the vehicle position module is configured to monitor vehicle position data by retrieving vehicle localization data derived from GPS sensor data that identifies the location of the vehicle on an internal vehicle map of the world.

14. The system of claim 9, further comprising a predicted objects module that comprises one or more processors configured by programming instructions encoded in non-transient computer readable media, the predicted objects module configured to:

monitor for one or more approaching vehicles in one or more opposing lanes to determine if the vehicle is clear of approaching vehicles that will cross within a desired turn path of the vehicle; and provide an indication as to whether the vehicle is clear of approaching vehicles that will cross within a desired turn path of the vehicle to the intersection state machine.

15. The system of claim 14, wherein the predicted objects module is configured to monitor for one or more approaching vehicles using camera image, radar, or lidar data.

16. The system of claim 14, wherein the predicted objects module is configured to determine that the vehicle is clear of approaching vehicles by:

predicting the movement of the one or more oncoming objects; and predicting whether the one or more predicted objects are traveling slow enough or will come to a stop to allow the vehicle to complete the left turn maneuver.

17. The system of claim 9, further comprising a traffic light monitoring module that comprises one or more processors configured by programming instructions encoded in non-transient computer readable media, the traffic light monitoring module configured to:
- monitor a traffic control device to determine if a relevant traffic signal for the lane in which the vehicle is located displays a green signal, a yellow signal, or a red signal; and
- provide the identity of the color displayed by the traffic signal to the intersection state machine.

18. The system of claim 9, further comprising a control module that comprises one or more processors configured by programming instructions encoded in non-transient computer readable media, the control module configured to:
- receive a message from the intersection state machine conveying that a stop point may be lifted; and
- control the vehicle to execute the left turn maneuver after receiving the message.

19. The system of claim 9, wherein predetermined amount of time comprises 2.5 seconds.

20. An autonomous vehicle, comprising:
- a plurality of sensing devices configured to:
  - determine a location of the autonomous vehicle along a route,
  - identify whether a relevant traffic signal displays a go signal, a caution signal, or a stop signal, and
  - identify one or more oncoming vehicles using camera image, radar, or lidar data; and
- an intersection state machine configured to:
  - when the autonomous vehicle is in a stopping zone in a lane wherein the stopping zone ends at a stop line, determine to perform a left turn maneuver when the autonomous vehicle is clear of approaching vehicles from all opposing lanes and a relevant traffic signal displays the go signal;
  - when the autonomous vehicle has entered a dilemma zone wherein the dilemma zone begins at the stop line and ends at the closest place where the lane is intersected by cross-traffic, determine to perform the left turn maneuver when the autonomous vehicle is clear of approaching vehicles from all opposing lanes and the relevant traffic signal displays the go signal, the caution signal, or has displayed the stop signal for less than a predetermined amount of time; and
  - when the autonomous vehicle has entered the cross-traffic zone or the velocity of the autonomous vehicle will propel the vehicle into the cross-traffic zone wherein the cross-traffic zone begins where the lane is intersected by cross-traffic, determine to perform the left turn maneuver when the vehicle is clear of approaching vehicles and the relevant traffic signal displays the go signal, the caution signal, or the stop signal.

* * * * *